(12) United States Patent
Abraham et al.

(10) Patent No.: US 9,094,175 B2
(45) Date of Patent: Jul. 28, 2015

(54) METHOD AND APPARATUS FOR SAVING POWER BY USING SIGNAL FIELD OF PREAMBLE

(75) Inventors: Santosh Paul Abraham, San Diego, CA (US); Hemanth Sampath, San Diego, CA (US); Sameer Vermani, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 407 days.

(21) Appl. No.: 13/182,190

(22) Filed: Jul. 13, 2011

(65) Prior Publication Data

US 2012/0182980 A1 Jul. 19, 2012

Related U.S. Application Data

(60) Provisional application No. 61/365,126, filed on Jul. 16, 2010.

(51) Int. Cl.
*H04L 1/00* (2006.01)

(52) U.S. Cl.
CPC ............ *H04L 1/0061* (2013.01); *H04L 1/0044* (2013.01); *H04L 2001/0093* (2013.01)

(58) Field of Classification Search
USPC .................................................. 370/328, 338
See application file for complete search history.

(56) References Cited

U.S. PATENT DOCUMENTS

| | | | |
|---|---|---|---|
| 5,142,539 A | 8/1992 | Dahlin et al. | |
| 7,281,187 B2 * | 10/2007 | Yonge et al. | 714/752 |
| 7,460,537 B2 * | 12/2008 | Millet et al. | 370/392 |
| 7,502,984 B2 | 3/2009 | Wei et al. | |
| 8,068,868 B2 | 11/2011 | Chen et al. | |
| 8,498,245 B2 * | 7/2013 | Wu et al. | 370/328 |
| 8,526,351 B2 * | 9/2013 | Fischer et al. | 370/312 |
| 2002/0170013 A1 * | 11/2002 | Bolourchi et al. | 714/758 |
| 2005/0114749 A1 * | 5/2005 | Yonge et al. | 714/752 |
| 2007/0177569 A1 * | 8/2007 | Lundby | 370/349 |
| 2007/0275657 A1 | 11/2007 | Chang et al. | |
| 2008/0095165 A1 | 4/2008 | Johnson et al. | |

(Continued)

FOREIGN PATENT DOCUMENTS

| | | |
|---|---|---|
| CN | 1306712 C | 3/2007 |
| EP | 1107079 A2 | 6/2001 |

(Continued)

OTHER PUBLICATIONS

Kraemer et al., IEEE P802.11ac, 2011, IEEE, D1.0.*
IEEE P802. 11ac/D1.0, Draft Standard for Information Technology—Telecommunications and information exchange between systems—Local and metropolitan area networks—Specific requirements, May 2011.
Interdigital: "Updated Recommendation for UE-specific CRC", Internet Citation, Nov. 5, 2001, XP002345604, Retrieved from the Internet: URL:http://www.3gpp.org/ftp/tsg_ran/WG1_RL1 [retrieved on Sep. 19, 2005].

(Continued)

*Primary Examiner* — Michael J Moore, Jr.
(74) *Attorney, Agent, or Firm* — Dang M. Vo

(57) ABSTRACT

Certain aspects of the present disclosure relate to a technique for power saving at mobile stations in Very High Throughput (VHT) systems using signal field bits of a preamble with a limited transmission overhead. The present disclosure proposes a method of indicating to a destination through a preamble cyclic redundancy check (CRC) checksum that the destination may be the intended destination of a transmission packet. The present disclosure also proposes a method of indicating to a destination through a preamble CRC that the destination may not be the intended destination of a transmission packet. In this case, decoding of the received packet can be terminated in order to save power at a receiving device.

79 Claims, 8 Drawing Sheets

(56) References Cited

U.S. PATENT DOCUMENTS

| | | |
|---|---|---|
| 2008/0160951 A1 | 7/2008 | Dominique et al. |
| 2010/0023830 A1* | 1/2010 | Wengerter et al. ............ 714/748 |
| 2010/0169733 A1 | 7/2010 | Kim et al. |
| 2010/0214995 A1 | 8/2010 | Iyer et al. |
| 2011/0032875 A1* | 2/2011 | Erceg et al. .................... 370/328 |
| 2011/0096796 A1* | 4/2011 | Zhang et al. ................... 370/474 |
| 2011/0131468 A1 | 6/2011 | Myers et al. |
| 2011/0194475 A1 | 8/2011 | Kim et al. |
| 2011/0194511 A1 | 8/2011 | Chen et al. |
| 2011/0216843 A1 | 9/2011 | Hsuan et al. |
| 2011/0255522 A9 | 10/2011 | Gorokhov et al. |
| 2011/0280232 A1* | 11/2011 | Wu et al. ....................... 370/338 |
| 2011/0299468 A1* | 12/2011 | Van Nee et al. ............... 370/328 |
| 2011/0319020 A1 | 12/2011 | Desai et al. |
| 2012/0089063 A1 | 4/2012 | Olson et al. |
| 2012/0117446 A1 | 5/2012 | Taghavi Nasrabadi et al. |
| 2013/0089063 A1 | 4/2013 | Yang et al. |
| 2013/0142094 A1 | 6/2013 | Homchaudhuri et al. |
| 2013/0235860 A1* | 9/2013 | Vermani et al. ............... 370/338 |

FOREIGN PATENT DOCUMENTS

| | | |
|---|---|---|
| JP | 2004531137 A | 10/2004 |
| JP | 2008172366 A | 7/2008 |
| WO | 0030378 | 5/2000 |
| WO | 0293296 A2 | 11/2002 |
| WO | 2009015170 A1 | 1/2009 |
| WO | 2010049296 A1 | 5/2010 |
| WO | 2011031058 A2 | 3/2011 |

OTHER PUBLICATIONS

International Search Report and Written Opinion—PCT/US2011/044272—ISA/EPO—Mar. 6, 2012.
Krishna Balachandran., et al., "Design of a Medium Access Control Feedback Mechanism for Cellular TDMA Packet Data Systems", IEEE Journal on Selected Areas in Communications, IEEE Service Center, Piscataway, US, vol. 18, No. 9, Sep. 1, 2000, pp. 1719-1730, XP011055200, ISSN: 0733-8716, DOI: 10.1109/49.887909.
LG Electronics: Beacon reception of long sleeper, Extend Submission, proposal 20111023r1, Oct. 23, 2011, 8 pages.

* cited by examiner

METHOD AND APPARATUS FOR SAVING POWER BY USING SIGNAL FIELD OF PREAMBLE

CLAIM OF PRIORITY UNDER 35 U.S.C. §119

The present application for patent claims benefit of U.S. Provisional Patent Application Ser. No. 61/365,126, entitled, "Saving power by using signal field of preamble", filed Jul. 16, 2010 and assigned to the assignee hereof and hereby expressly incorporated by reference herein.

BACKGROUND

1. Field

Certain aspects of the present disclosure generally relate to wireless communications and, more particularly, to a method and apparatus for power savings in Very High Throughput (VHT) wireless systems using a signal field bits of a transmission preamble.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for communications. The apparatus generally includes a first circuit configured to define a first signal field by altering a second signal field, wherein the alteration is based on at least one identifier, a second circuit configured to generate a checksum for the first signal field, and a transmitter configured to transmit a packet comprising the second signal field with the checksum generated for the first signal field therein.

Certain aspects of the present disclosure provide a method for communications. The method generally includes defining a first signal field by altering a second signal field, wherein the alteration is based on at least one identifier, generating a checksum for the first signal field, and transmitting a packet comprising the second signal field with the checksum generated for the first signal field therein.

Certain aspects of the present disclosure provide an apparatus for communications. The apparatus generally includes means for defining a first signal field by altering a second signal field, wherein the alteration is based on at least one identifier, means for generating a checksum for the first signal field, and means for transmitting a packet comprising the second signal field with the checksum generated for the first signal field therein.

Certain aspects of the present disclosure provide a computer-program product for communications. The computer-program product includes a computer-readable medium comprising instructions executable to define a first signal field by altering a second signal field, wherein the alteration is based on at least one identifier, generate a checksum for the first signal field, and transmit a packet comprising the second signal field with the checksum generated for the first signal field therein.

Certain aspects of the present disclosure provide an access point. The access point generally includes at least one antenna, a first circuit configured to define a first signal field by altering a second signal field, wherein the alteration is based on at least one identifier, a second circuit configured to generate a checksum for the first signal field, and a transmitter configured to transmit via the at least one antenna a packet comprising the second signal field with the checksum generated for the first signal field therein.

Certain aspects of the present disclosure provide an apparatus for communications. The apparatus generally includes a receiver configured to receive a packet comprising a first signal field with a checksum therein, a first circuit configured to define a second signal field by altering the first signal field, wherein the alteration is based on at least one identifier, a second circuit configured to generate a checksum for the second signal field, and a third circuit configured to compare the generated checksum with the received checksum, and to determine that the packet is associated with the at least one identifier if the generated checksum matches the received checksum.

Certain aspects of the present disclosure provide a method for communications. The method generally includes receiving a packet comprising a first signal field with a checksum therein, defining a second signal field by altering the first signal field, wherein the alteration is based on at least one identifier, generating a checksum for the second signal field, comparing the generated checksum with the received checksum, and determining that the packet is associated with the at least one identifier if the generated checksum matches the received checksum.

Certain aspects of the present disclosure provide an apparatus for communications. The apparatus generally includes means for receiving a packet comprising a first signal field with a checksum therein, means for defining a second signal field by altering the first signal field, wherein the alteration is based on at least one identifier, means for generating a checksum for the second signal field, means for comparing the generated checksum with the received checksum, and means for determining that the packet is associated with the at least one identifier if the generated checksum matches the received checksum.

Certain aspects of the present disclosure provide a computer-program product for communications. The computer-program product includes a computer-readable medium comprising instructions executable to receive a packet comprising a first signal field with a checksum therein, define a second signal field by altering the first signal field, wherein the alteration is based on at least one identifier, generate a checksum for the second signal field, compare the generated checksum with the received checksum, and determine that the packet is associated with the at least one identifier if the generated checksum matches the received checksum.

Certain aspects of the present disclosure provide an access terminal. The access terminal generally includes at least one antenna, a receiver configured to receive, via the at least one antenna, a packet comprising a first signal field with a checksum therein, a first circuit configured to define a second signal field by altering the first signal field, wherein the alteration is based on at least one identifier, a second circuit configured to generate a checksum for the second signal field, and a third circuit configured to compare the generated checksum with the received checksum, and to determine that the packet is associated with the at least one identifier if the generated checksum matches the received checksum.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
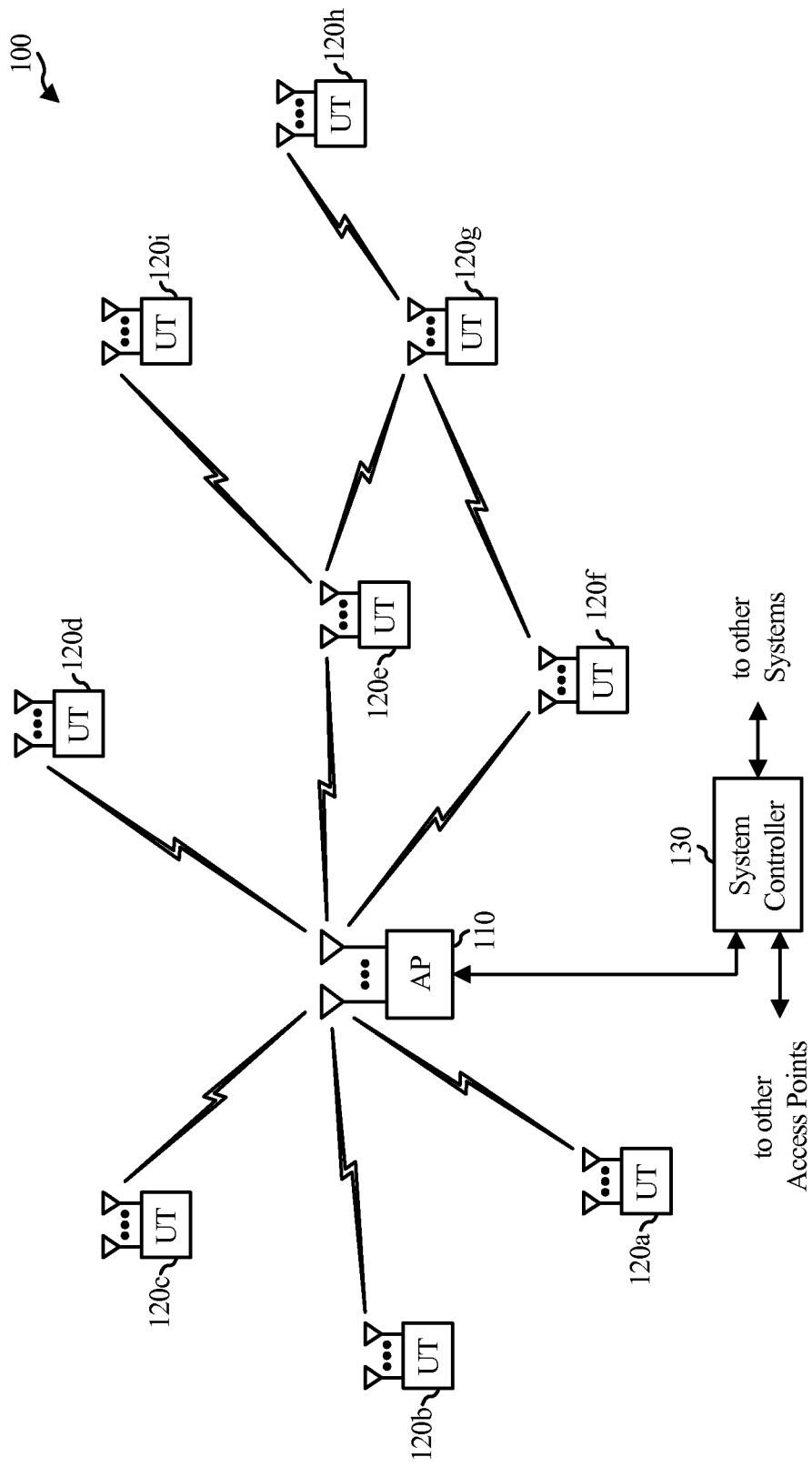
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
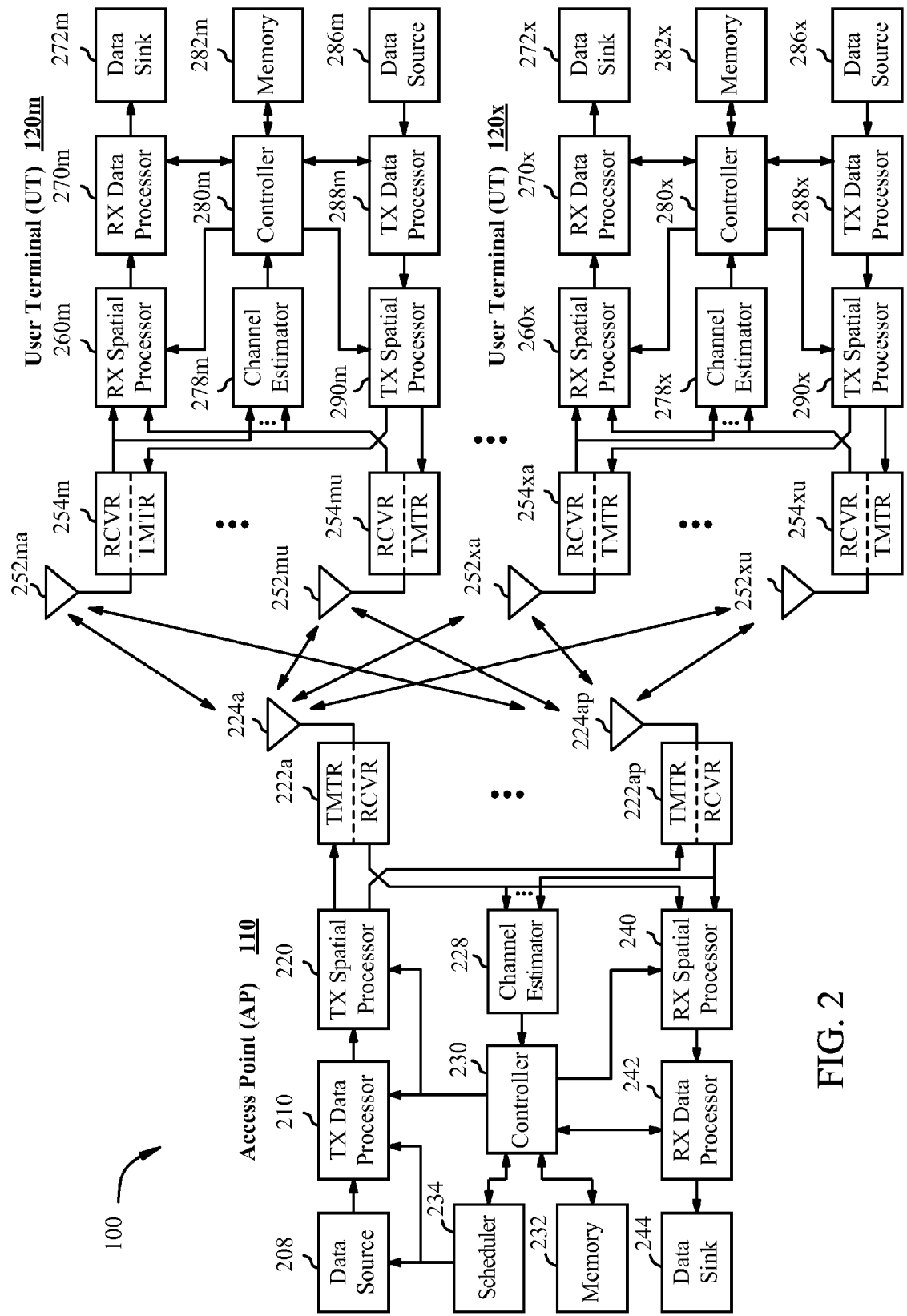
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ ser terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

According to certain aspects of the present disclosure, it can be advantageous to reduce power consumed by the user terminals 120 by ensuring that these terminals terminate decoding early on received packets that are destined for other user terminals. To ensure early termination of the decoding process at a user terminal 120, a destination and/or a source identifier may be stored, for example, within a Signal (SIG) field of a preamble, wherein the preamble may be transmitted within a packet (frame) from the AP 110 to a plurality of user terminals 120. A user terminal 120 of the plurality of user terminals may therefore determine if the packet is destined for that user terminal by simply checking the received preamble.

Figure 3:
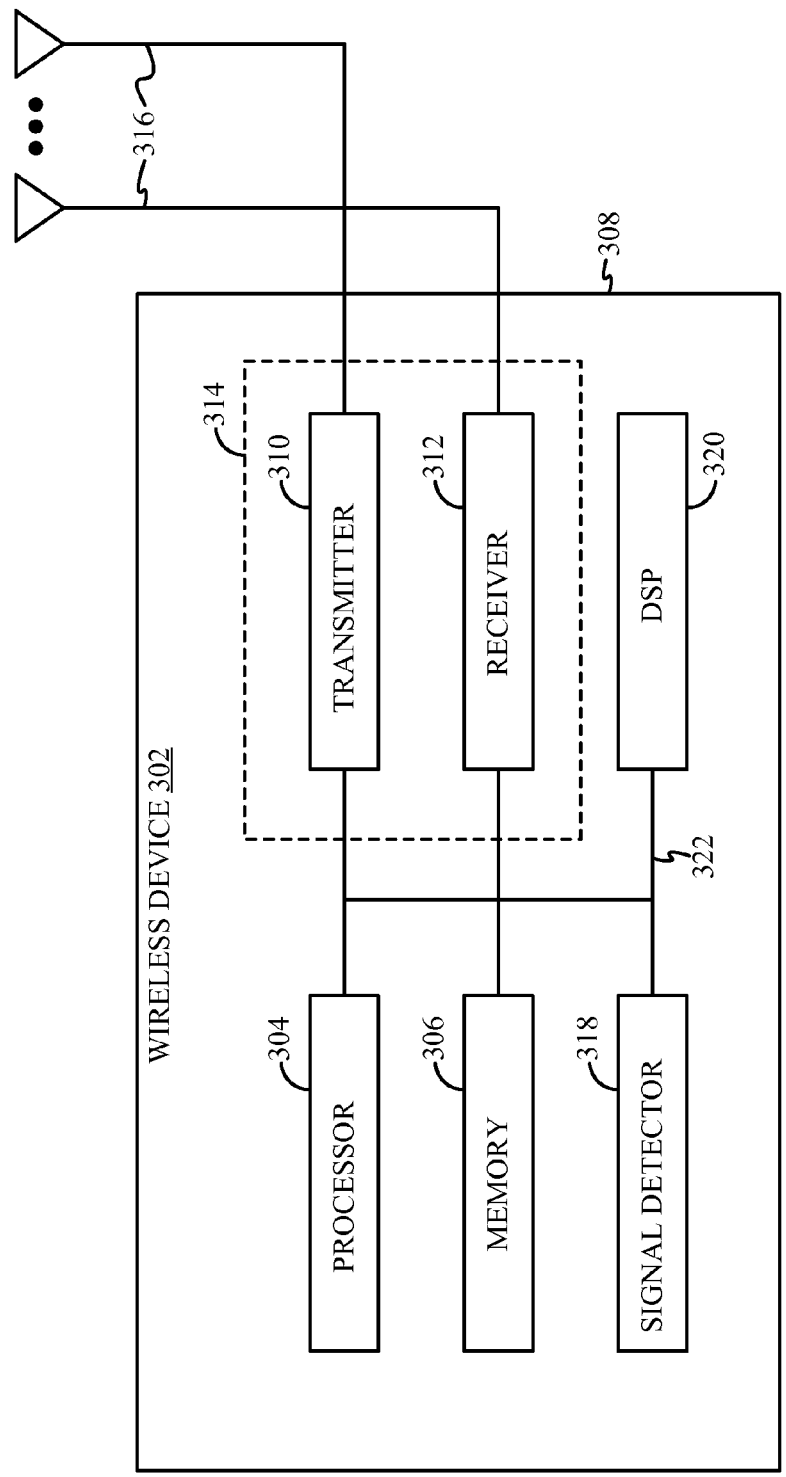
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be the access point 110 or any of user terminals 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

The wireless system 100 illustrated in FIG. 1 may correspond to the IEEE 802.11 ac based wireless communications system. The IEEE 802.11 ac represents a new 802.11 amendment that allows for higher throughput in 802.11 wireless networks. The higher throughput may be realized through several measures such as parallel transmissions to multiple user stations (STAs) at once, or by using a wider channel bandwidth (e.g., 80 MHz or 160 MHz). The IEEE 802.11ac is also referred to as Very High Throughput (VHT) wireless communications standard.

In VHT wireless networks, it can be advantageous to reduce the power consumed by mobile devices by ensuring that these devices terminate decoding early on packets that are destined for other mobile STAs. One method for ensuring early termination of the decoding process at a receive STA can be to store a destination and possible source identifier within a SIG field of preamble, wherein the preamble may be transmitted from an access point to a plurality of STAs within a packet (frame). A STA of the plurality of STAs may therefore determine if the packet is destined for that STA by simply checking the preamble. However, additional bits required to signal the source and destination may cause high transmission overhead.

Certain aspects of the present disclosure support a low overhead method for signaling the required identifiers by using Cyclic Redundancy Check (CRC) fields that are already present in the SIG field of the preamble.

Structure of Preamble and Data in a Transmission Frame

Figure 4:
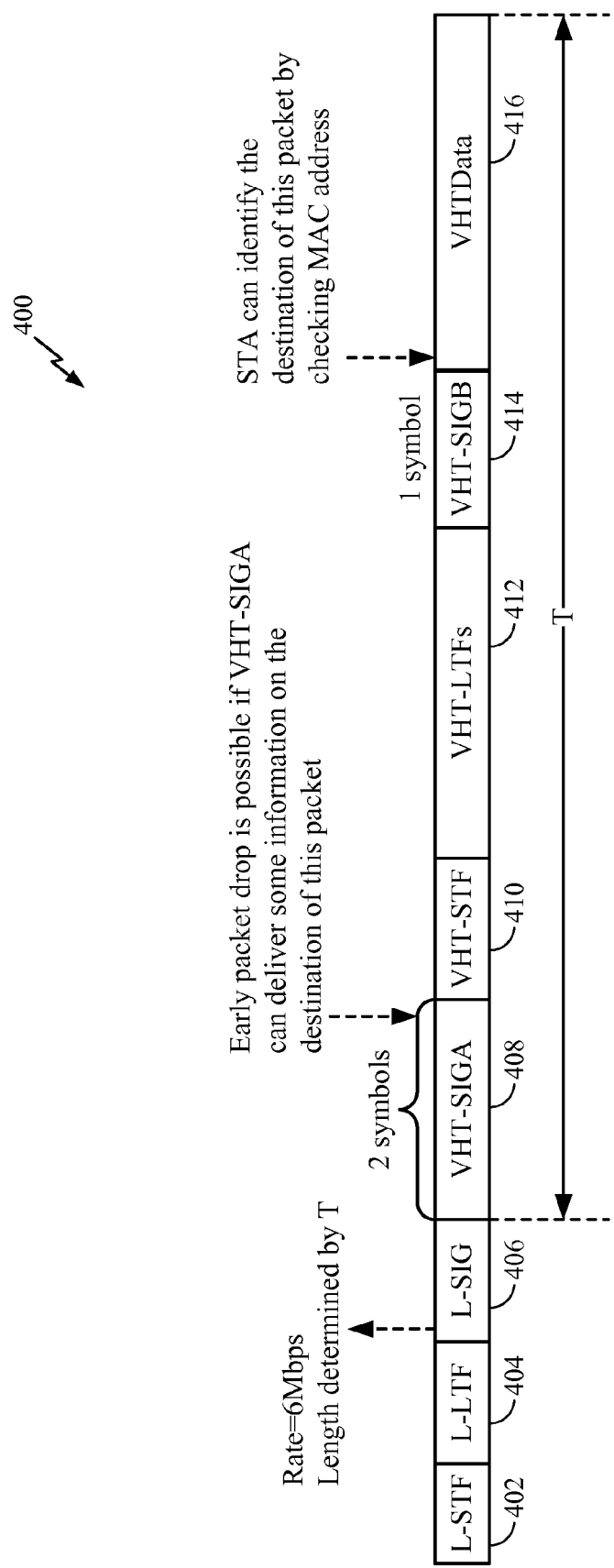
FIG. 4 illustrates an example structure of a transmission preamble and data of a Physical layer Protocol Data Unit (PPDU) in accordance with certain aspects of the present disclosure.

FIG. 4 illustrates an example structure of a frame 400 in accordance with certain aspects of the present disclosure. The frame 400 may be transmitted, for example, from the access point 110 to the user STAs 120 in the wireless network 100 illustrated in FIG. 1. Alternatively, the frame 400 may be transmitted from one of the STAs 120 to another STA 120. Transmission of the frame 400 may be performed, for example, in accordance with a radio technology based on IEEE 802.11 family of wireless communications standards.

In Wireless Local Area Networks (WLANs), the process of decoding a packet (e.g., the frame 400) may comprise several steps. A Legacy Short Training Field (L-STF) 402 of the frame 400 may be first received at one or more STAs and used for Automatic Gain Control (AGC) settings. After that, a Legacy Long Training Field (L-LTF) 404 may be received. The reception of L-LTF 404 may ensure that a Legacy Signal field (L-SIG) 406 following the L-LTF 404 may be decoded. The received L-SIG field 406 may provide duration in symbols of the transmitted frame 400.

Following the L-SIG field 406, a Very High Throughput Signal field type A (i.e., VHT-SIGA field 408) may be received. This field may provide necessary bits to inform the user STA about a number of dedicated spatial streams and about a Modulation-Coding Scheme (MCS) for data in the case of Single-User (SU) transmission.

Following a Very High Throughput Short Training Field (VHT-STF) 410 and Very High Throughput Long Training Fields (VHT-LTFs) 412 that may be utilized for channel estimation, the STAs may also receive a VHT-SIGB field 414 (Very High Throughput Signal field type B) associated with Multi-User Multiple-Input Multiple-Output (MU-MIMO) transmissions. This field may be used to provide MCS and possibly length information to each destination STA separately. Data 416 may follow the VHT-SIGB field 414, as illustrated in FIG. 4.

A destination STA may stop a decoding process if it fails to correctly decode at least one of the VHT-SIGA field 408 or the VHT-SIGB field 414. It should be noted that if a CRC sum of these fields does not pass, then the receiving STA may not be able to determine an MCS and a spatial stream index for received data. Therefore, by forcing the CRC error at some or all receiver STAs that are not intended destinations, it may be possible to ensure that STAs do not waste power for decoding the packet that is not intended for them.

Power Save Using Signal (SIG) Fields of Preamble

One method for power-saving using SIG field bits of a preamble of a transmission packet (frame) may be to stop decoding process at all destination STAs except at an intended destination by scrambling the SIG field bit-sequence using an identifier known at an intended receiver and at a transmitter. However, an arbitrary scrambler may change ordering of bits within the SIG field, and thereby it may complicate the decoding process at the receiving STA.

A method is proposed in the present disclosure that may preserve the order of the SIG field bits in the preamble. This method may force a CRC failure at a STA that is not the intended destination of the transmitted packet.

For a Single-User (SU) frame that may need to be decoded only at the intended destination, the CRC sum may be computed for at least one of a VHT-SIGA field or a VHT-SIGB field of the preamble augmented with at least one of a destination identifier (ID) or a source ID. For frames that may need to be decoded at all destinations (e.g., broadcast frames or frames for which Network Allocation Vector (NAV) information may need to be communicated to all STAs), the current procedure for computing the CRC sum may be utilized.

At all destinations, the decoding of SIG fields may comprise two steps. The CRC sum for the received VHT-SIGA/VHT-SIGB bits may be first computed, and then it may be checked if the CRC passes. If the CRC passes, then the STA may proceed to decode the received packet. On the other hand, if the CRC fails, then the STA may re-compute the VHT-SIGA/VHT-SIGB CRC sum by augmenting the received bits with at least one of the source ID or the destination ID. If the new CRC passes, then the STA may proceed to decode the packet. Otherwise, the STA may abort the decoding process.

One way of augmenting at least one of the source or destination identifier bits at a transmitting node (e.g., an access point) may be to prefix or post-fix the source and/or destination identifier bits to the SIG bits before computing the CRC sum. However, augmenting at least one of the source or destination IDs at a fixed position for all cases may cause the CRC sum to pass at several destination STAs since the number of CRC sum bits may be small. For example, the case can be considered where an 8-bit destination ID is post-fixed before computing a 4-bit CRC sum. In this exemplary case, there may be $2^8/2^4$ destination IDs where the CRC sum may pass. Therefore, the power saving may not work for such destination STAs.

In order to reduce the likelihood of a CRC passing at an unintended destination, the position of where at least one of the source or destination identifier bits are inserted within the SIG field bits before computing the CRC sum may vary. An example of this procedure that may be performed at the transmitter node is illustrated in FIG. 5.

Figure 5:
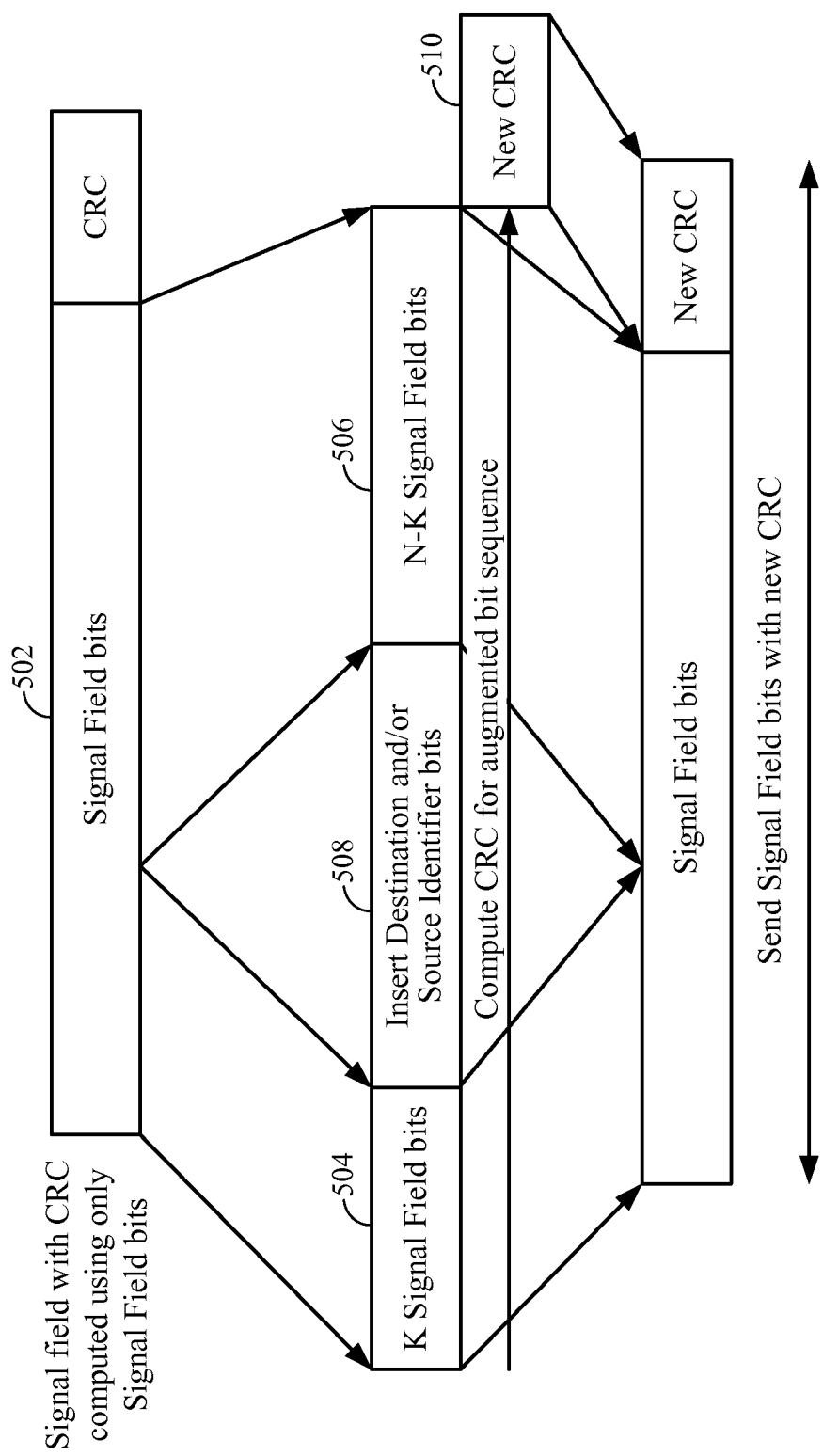
FIG. 5 illustrates an example procedure for computing a Cyclic Redundancy Check (CRC) sum for a signal field of the preamble augmented with at least one of a destination identifier or a source identifier in accordance with certain aspects of the present disclosure.

As illustrated in FIG. 5, a parameter K<N may be chosen based on at least one of the destination ID or the source ID (e.g., using a certain function), where SIG field bits 502 of a preamble may comprise a total of N bits. These N bits of the SIG field 502 may be split into two groups of K and N-K bits (i.e., groups 504 and 506, respectively, as illustrated in FIG. 5). The destination and/or source identifier bits 508 may be then inserted after the K first bits 504, and the N-K remaining bits 506 may be appended to this bit sequence before computing a CRC sum 510.

At a receiver STA, the STA may repeat the aforementioned procedure of inserting at least one of STA ID bits or source ID bits by applying the function used at the transmitter and the STA's own ID. If a computed CRC sum does not pass (i.e., if it is not equal to the CRC sum 510), then the STA may stop decoding the received packet.

The above procedure of inserting at least one of the destination ID or source ID bits may be also performed for other partitions of the SIG field bits. For example, the SIG field bits may be split into three or four parts of varying sizes. Similarly, the destination and/or source ID bits may be also split up into several parts and then inserted in between the partitions of the SIG field before computing the CRC sum.

It should be noted that the proposed scheme may preserve the order of the SIG field bits. In one aspect of the present disclosure, one of the bits of the SIG field may be used to indicate if the CRC sum was computed using only the SIG field bits or using the proposed augmentation method.

Figure 6:
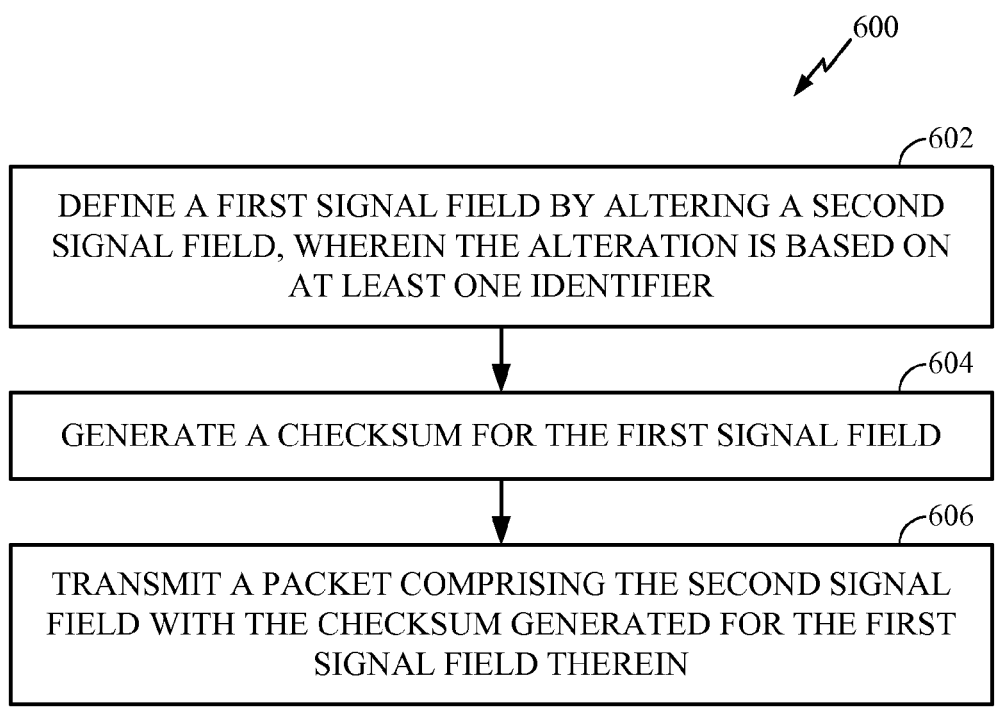
FIG. 6 illustrates example operations that may be performed at a transmitter device in accordance with certain aspects of the present disclosure.

FIG. 6 illustrates example operations 600 that may be performed at a transmitter side (e.g., an access point) of a wireless communications system in accordance with certain aspects of the present disclosure. At 602, the transmitter may define a first signal field by altering a second signal field, wherein the alteration may be based on at least one identifier. At 604, a checksum may be generated for the first signal field. At 606, the transmitter may transmit a packet comprising the second signal field with the checksum generated for the first signal field therein.

Locations of bits of the second signal field modified during the alteration may be determined based on the at least one identifier. In one aspect of the present disclosure, the alteration may comprise inserting the at least one identifier into the second signal field to define the first signal field. In another aspect, the alteration may comprise performing XOR operation between at least one bit of the second signal field and at least one bit of the at least one identifier.

In yet another aspect, the alteration may comprise dividing the second signal field into a plurality of sub-fields, and altering bits in one or more of the sub-fields. The plurality of sub-fields may comprise a first non-altered sub-field and a second non-altered sub-field, and at least one of a size of the first non-altered sub-field or a size of the second non-altered sub-field may be based on the at least one identifier. The at least one of the size of first non-altered sub-field or the size of second non-altered sub-field may be provided to an apparatus associated with the at least one identifier.

In one aspect of the present disclosure, the at least one identifier may comprise at least one of a source ID or a destination ID. The transmitter node may provide information related to the alteration to an apparatus associated with the destination ID. Further, the transmitter node may indicate, to an apparatus associated with the destination ID, a procedure used for the alteration.

In another aspect, the at least one identifier may comprise a group ID. The transmitter node may indicate, to an apparatus associated with the group ID, a procedure used for the alteration.

In one aspect of the present disclosure, the checksum may be placed in a header of the packet being transmitted in accordance with IEEE 802.11 family of wireless communications standards. The header may represent a service field of the packet.

For certain aspects of the present disclosure, the second signal field may comprise at least one of a VHT-SIGA field or a VHT-SIGB field of the packet, wherein the packet may be transmitted in accordance with IEEE 802.11 family of wireless communications standards.

For certain aspects of the present disclosure, the at least one identifier may comprise at least one of: an association identification (AID) of a source apparatus transmitting the packet, an AID of a destination apparatus, or a Basic Service Set Identification (BSSID) of an access point serving at least one of the source apparatus or the destination apparatus.

Figure 7:
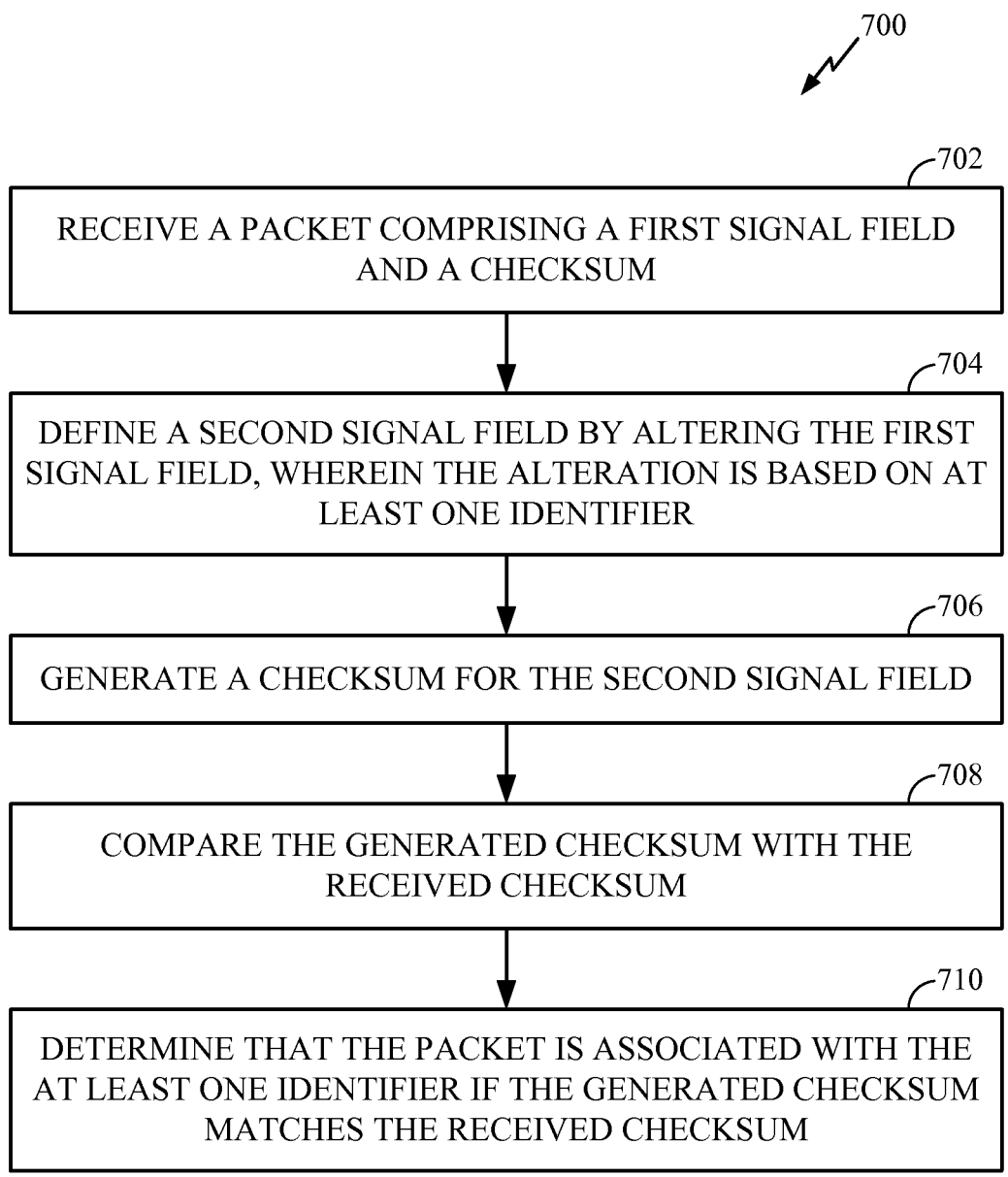
FIG. 7 illustrates example operations that may be performed at a receiver device in accordance with certain aspects of the present disclosure.

FIG. 7 illustrates example operations 700 that may be performed at a receiver side of a wireless communications system (i.e., at a user STA or an access terminal) in accordance with certain aspects of the present disclosure. At 702, the STA may receive a packet comprising a first signal field with a checksum therein. At 704, the STA may define a second signal field by altering the first signal field, wherein the alteration may be based on at least one identifier. At 706, another checksum may be generated for the second signal field. At 708, the generated checksum may be compared with the received checksum. At 710, the STA may determine that the packet is associated with the at least one identifier if the generated checksum matches the received checksum. In an aspect, further processing of the packet by the STA may be disabled, if the generated checksum does not match the received checksum.

In one aspect, the at least one identifier may comprise at least one of a source ID or a destination ID. In another aspect, the at least one identifier may comprise a group ID associated with one or more STAs.

In an aspect, the second signal field may be created from the first signal field when another checksum generated for the first signal field does not match the received checksum. In an aspect, the STA may receive signaling information related to the alteration, and the second signal field may be defined at the STA based on the signaling information.

In summary, the present disclosure proposes a method of indicating to a destination STA through a preamble CRC that the destination STA may be the intended destination of a transmission packet. The present disclosure also proposes a method of indicating to a destination STA through a preamble CRC that the destination STA may not be the intended destination of a transmission packet.

In an aspect, a SIG field of a preamble within a packet intended for a destination STA may be generated by scrambling bits of the SIG field using a scrambling function that utilizes the destination and/or source identifiers. In another aspect, the SIG field bits of preamble may be augmented with at least one of source or destination identifier bits. Then, a CRC sum may be computed for the augmented bits, and the computed CRC sum may be inserted in the transmitted SIG field.

In one aspect of the present disclosure, the augmentation of the SIG field bits with at least one of destination or source identifier bits may be achieved by pre-fixing or post-fixing at least one of the destination or source identifier bits to the SIG field bits.

In another aspect of the present disclosure, the augmentation of the SIG field bits may be achieved by first dividing the SIG fields into n disjoint subsets where the exact pattern of dividing the SIG field bits may be based on at least one of the destination identifier or the source identifier. Then, at least one of the destination or source identifier bits may be divided into at most n−1 disjoint subsets. These disjoint subsets may be interleaved with the SIG field bits subset. After that, the CRC sum of the interleaved bits may be computed and set into a CRC field of the SIG field within a preamble.

At a receiver side, received SIG field bits within a preamble may be decoded, where a CRC sum of the SIG field bits may be computed according to the augmentation of at least one of destination or source identifier bits with the SIG field bits. The receiver's own destination identifier and/or known source identifier may be utilized.

A method for power saving at a receiver STA may comprise computing the CRC sum of the SIG field using the received SIG field bits and checking the computed CRC sum against the CRC field in the transmitted packet.

In one aspect of the present disclosure, one of the bits of the transmitted SIG field may be used to indicate a method applied at a transmitting node for computing the CRC sum. The receiver STA may check that bit in the received SIG field before computing the CRC sum.

Figure 6A:
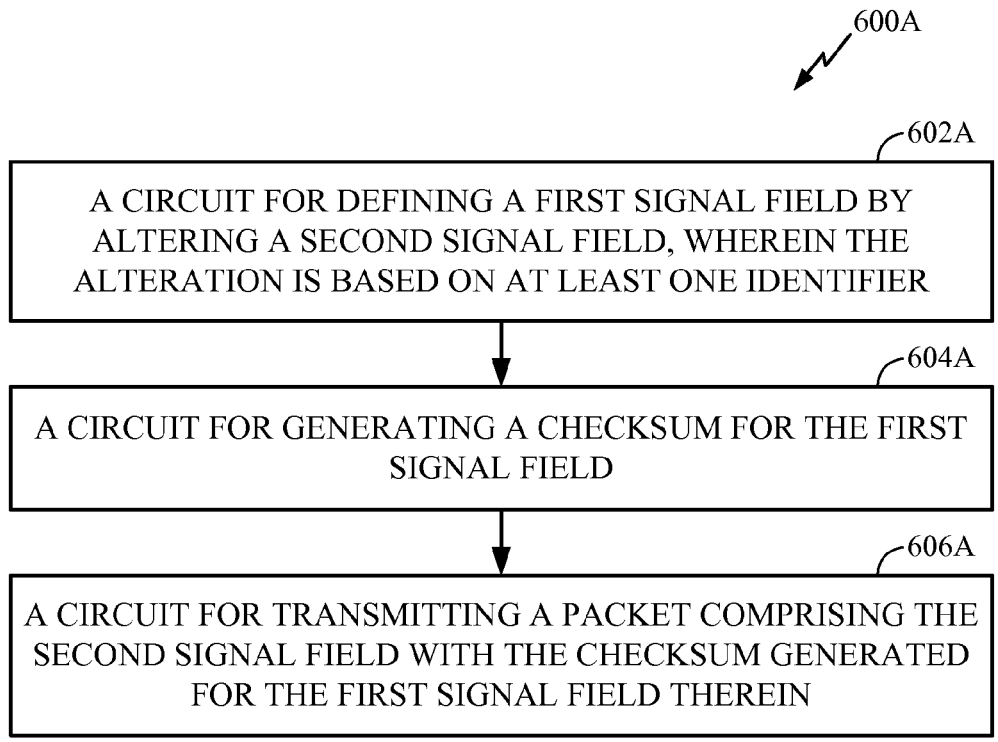
FIG. 6A illustrates example components capable of performing the operations shown in FIG. 6.
Figure 7A:
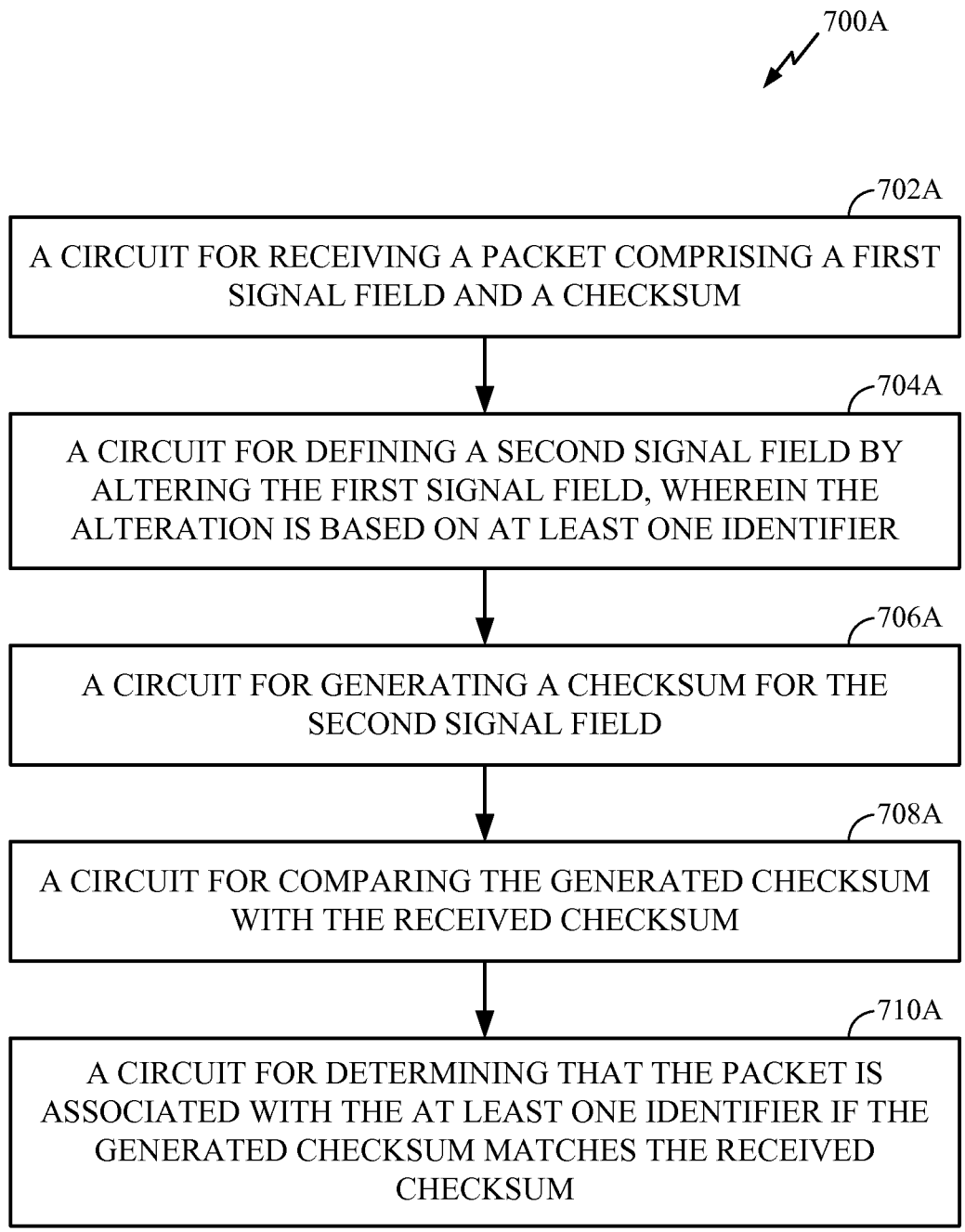
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600 and 700 illustrated in FIGS. 6 and 7 correspond to components 600A and 700A illustrated in FIGS. 6A and 7A.

For example, the means for defining may comprise an application specific integrated circuit, e.g., the processor 210 from FIG. 2 of the access point 110, the processor 270 from FIG. 2 of the user terminal 120, or the processor 304 from FIG. 3 of the wireless device 302. The means for generating may comprise an application specific integrated circuit, e.g., the processor 210, the processor 270, or the processor 304. The means for transmitting may comprise a transmitter, e.g., the transmitter 222 from FIG. 2 of the access point 110, or the transmitter 310 from FIG. 3 of the wireless device 302. The means for inserting may comprise an application specific integrated circuit, e.g., the processor 210, the processor 270, or the processor 304. The means for performing may comprise an application specific integrated circuit, e.g., the processor 210, the processor 270, or the processor 304. The means for dividing may comprise an application specific integrated circuit, e.g., the processor 210, the processor 270, or the processor 304. The means for altering may comprise an application specific integrated circuit, e.g., the processor 210, the processor 270, or the processor 304. The means for providing may comprise an application specific integrated circuit, e.g., the processor 210, or the processor 304. The means for scrambling may comprise an application specific integrated circuit, e.g., the processor 210, the processor 270, or the processor 304. The means for indicating may comprise an application specific integrated circuit, e.g., the processor 210, or the processor 304. The means for receiving may comprise a receiver, e.g., the receiver 254 from FIG. 2 of the user terminal 120, or the receiver 312 from FIG. 3 of the wireless device 302. The means for comparing may comprise an application specific integrated circuit (a comparator), e.g., the processor 270, or the processor 304. The means for determining may comprise an application specific integrated circuit, e.g., the processor 270, or the processor 304. The means for disabling may comprise an application specific integrated circuit, e.g., the processor 270, or the processor 304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of items refers to any combination of those items, including single members. As an example," at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for communications, comprising:
a first circuit configured to define a first signal field by altering a second signal field, wherein the alteration is based on at least one identifier, and wherein the alteration comprises:
dividing the second signal field into a plurality of subfields, and
inserting a bit sequence corresponding to the at least one identifier between the plurality of subfields;
a second circuit configured to generate a checksum for the first signal field; and
a transmitter configured to transmit a packet comprising the second signal field with the checksum generated for the first signal field therein.

2. The apparatus of claim 1, wherein locations of bits of the second signal field modified during the alteration are determined based on the at least one identifier.

3. The apparatus of claim 1, wherein the first circuit is also configured to:
perform XOR operation between at least one bit of the second signal field and at least one bit of the at least one identifier.

4. The apparatus of claim 1, wherein:
the plurality of sub-fields comprise a first non-altered subfield and a second non-altered sub-field, and
at least one of a size of the first non-altered sub-field or a size of the second non-altered sub-field is based on the at least one identifier.

5. The apparatus of claim 4, further comprising:
a third circuit configured to provide the at least one of the size of first non-altered sub-field or the size of second non-altered sub-field to an apparatus associated with the at least one identifier.

6. The apparatus of claim 1, wherein the first circuit is also configured to:
scramble bits of the second signal field based on the at least one identifier to define the first signal field.

7. The apparatus of claim 1, wherein the at least one identifier comprises at least one of a source ID or a destination ID.

8. The apparatus of claim 7, further comprising:
a third circuit configured to provide information related to the alteration to an apparatus associated with the destination ID.

9. The apparatus of claim 7, further comprising:
a third circuit configured to indicate, to an apparatus associated with the destination ID, a procedure used for the alteration.

10. The apparatus of claim 1, wherein the at least one identifier comprises a group ID, and the apparatus further comprising:
a third circuit configured to indicate, to an apparatus associated with the group ID, a procedure used for the alteration.

11. The apparatus of claim 1, wherein:
the checksum is placed in a header of the packet being transmitted in accordance with IEEE 802.11 family of wireless communications standards, and
the header comprises a service field of the packet.

12. The apparatus of claim 1, wherein the second signal field comprises at least one of a Very High Throughput Signal field type A or a Very High Throughput Signal field type B of the packet transmitted in accordance with IEEE 802.11 family of wireless communications standards.

13. The apparatus of claim 1, wherein the at least one identifier comprises at least one of: an association identification (AID) of a source apparatus transmitting the packet, an AID of a destination apparatus, or a Basic Service Set Identification (BSSID) of an access point serving at least one of the source apparatus or the destination apparatus.

14. A method for communications, comprising:
defining a first signal field by altering a second signal field, wherein the alteration is based on at least one identifier, and wherein the alteration comprises:
dividing the second signal field into a plurality of sub-fields, and
inserting a bit sequence corresponding to the at least one identifier between the plurality of subfields;
generating a checksum for the first signal field; and
transmitting a packet comprising the second signal field with the checksum generated for the first signal field therein.

15. The method of claim 14, wherein locations of bits of the second signal field modified during the alteration are determined based on the at least one identifier.

16. The method of claim 14, wherein defining the first signal field further comprises:
performing XOR operation between at least one bit of the second signal field and at least one bit of the at least one identifier.

17. The method of claim 14, wherein:
the plurality of sub-fields comprise a first non-altered sub-field and a second non-altered sub-field, and
at least one of a size of the first non-altered sub-field or a size of the second non-altered sub-field is based on the at least one identifier.

18. The method of claim 17, further comprising:
providing the at least one of the size of first non-altered sub-field or the size of second non-altered sub-field to an apparatus associated with the at least one identifier.

19. The method of claim 14, wherein defining the first signal field further comprises:
scrambling bits of the second signal field based on the at least one identifier.

20. The method of claim 14, wherein the at least one identifier comprises at least one of a source ID or a destination ID.

21. The method of claim 20, further comprising:
providing information related to the alteration to an apparatus associated with the destination ID.

22. The method of claim 20, further comprising:
indicating, to an apparatus associated with the destination ID, a procedure used for the alteration.

23. The method of claim 14, wherein the at least one identifier comprises a group ID, and the method further comprising:
indicating, to an apparatus associated with the group ID, a procedure used for the alteration.

24. The method of claim 14, wherein:
the checksum is placed in a header of the packet being transmitted in accordance with IEEE 802.11 family of wireless communications standards, and
the header comprises a service field of the packet.

25. The method of claim 14, wherein the second signal field comprises at least one of a Very High Throughput Signal field type A or a Very High Throughput Signal field type B of the packet transmitted in accordance with IEEE 802.11 family of wireless communications standards.

26. The method of claim 14, wherein the at least one identifier comprises at least one of: an association identification (AID) of a source apparatus transmitting the packet, an AID of a destination apparatus, or a Basic Service Set Identification (BSSID) of an access point serving at least one of the source apparatus or the destination apparatus.

27. An apparatus for communications, comprising:
means for defining a first signal field by altering a second signal field based on at least one identifier, wherein the alteration comprises:
dividing the second signal field into a plurality of sub-fields; and
inserting a bit sequence corresponding to the at least one identifier between the plurality of subfields;
means for generating a checksum for the first signal field; and
means for transmitting a packet comprising the second signal field with the checksum generated for the first signal field therein.

28. The apparatus of claim 27, wherein locations of bits of the second signal field modified during the alteration are determined based on the at least one identifier.

29. The apparatus of claim 27, further comprising:
means for performing XOR operation between at least one bit of the second signal field and at least one bit of the at least one identifier to define the first signal field.

30. The apparatus of claim 27, wherein:
the plurality of sub-fields comprise a first non-altered sub-field and a second non-altered sub-field, and
at least one of a size of the first non-altered sub-field or a size of the second non-altered sub-field is based on the at least one identifier.

31. The apparatus of claim 30, further comprising:
means for providing the at least one of the size of first non-altered sub-field or the size of second non-altered sub-field to an apparatus associated with the at least one identifier.

32. The apparatus of claim 27, further comprising:
means for scrambling bits of the second signal field based on the at least one identifier to define the first signal field.

33. The apparatus of claim 27, wherein the at least one identifier comprises at least one of a source ID or a destination ID.

34. The apparatus of claim 33, further comprising:
means for providing information related to the alteration to an apparatus associated with the destination ID.

35. The apparatus of claim 33, further comprising:
means for indicating, to an apparatus associated with the destination ID, a procedure used for the alteration.

36. The apparatus of claim 27, wherein the at least one identifier comprises a group ID, and the apparatus further comprising:
means for indicating, to an apparatus associated with the group ID, a procedure used for the alteration.

37. The apparatus of claim 27, wherein:
the checksum is placed in a header of the packet being transmitted in accordance with IEEE 802.11 family of wireless communications standards, and
the header comprises a service field of the packet.

38. The apparatus of claim 27, wherein the second signal field comprises at least one of a Very High Throughput Signal field type A or a Very High Throughput Signal field type B of the packet transmitted in accordance with IEEE 802.11 family of wireless communications standards.

39. The apparatus of claim 27, wherein the at least one identifier comprises at least one of: an association identification (AID) of a source apparatus transmitting the packet, an AID of a destination apparatus, or a Basic Service Set Identification (BSSID) of an access point serving at least one of the source apparatus or the destination apparatus.

40. A computer-program product for communications, comprising a non-transitory computer-readable medium encoded with instructions executable to:

define a first signal field by altering a second signal field, wherein the alteration is based on at least one identifier, and wherein alteration comprises:
dividing the second signal field into a plurality of subfields, and
inserting the at least one identifier between the plurality of subfields;
generate a checksum for the first signal field; and
transmit a packet comprising the second signal field with the checksum generated for the first signal field therein.

41. An access point, comprising:
at least one antenna;
a first circuit configured to define a first signal field by altering a second signal field, wherein the alteration is based on at least one identifier, and wherein the alteration comprises:
dividing the second signal field into a plurality of subfields, and
inserting a bit sequence corresponding to the at least one identifier between the plurality of subfields;
a second circuit configured to generate a checksum for the first signal field; and
a transmitter configured to transmit, via the at least one antenna, a packet comprising the second signal field with the checksum generated for the first signal field therein.

42. An apparatus for communications, comprising:
a receiver configured to receive a packet comprising a first signal field with a checksum therein;
a first circuit configured to define a second signal field by altering the first signal field, wherein the alteration is based on at least one identifier, and wherein the wherein the alteration comprises:
dividing the first signal field into a plurality of sub-fields; and
inserting a bit sequence corresponding to the at least one identifier between the plurality of subfields;
a second circuit configured to generate a checksum for the second signal field; and
a third circuit configured to compare the generated checksum with the received checksum, and to determine that the packet is associated with the at least one identifier if the generated checksum matches the received checksum.

43. The apparatus of claim 42, wherein locations of bits of the first signal field modified during the alteration are determined based on the at least one identifier.

44. The apparatus of claim 42, wherein the first circuit is also configured to:
perform XOR operation between at least one bit of the first signal field and at least one bit of the at least one identifier.

45. The apparatus of claim 42, wherein:
the plurality of sub-fields comprise a first non-altered sub-field and a second non-altered sub-field, and
at least one of a size of the first non-altered sub-field or a size of the second non-altered sub-field is based on the at least one identifier.

46. The apparatus of claim 45, wherein the receiver is also configured to:
receive signaling of the at least one of the size of first non-altered sub-field or the size of second non-altered sub-field.

47. The apparatus of claim 42, wherein the first circuit is also configured to:
scramble bits of the first signal field based on the at least one identifier to define the second signal field.

48. The apparatus of claim 42, wherein:
the receiver is also configured to receive signaling information related to the alteration, and
the first circuit is also configured to define the second signal field based on the signaling information.

49. The apparatus of claim 42, wherein the at least one identifier comprises at least one of a source ID or a destination ID.

50. The apparatus of claim 49, wherein the receiver is also configured to:
receive an indication about a procedure used for computing the received checksum at an apparatus associated with the source ID.

51. The apparatus of claim 42, wherein:
the at least one identifier comprises a group ID, and
the receiver is also configured to receive an indication about a procedure used for computing the received checksum at an apparatus associated with the group ID.

52. The apparatus of claim 42, wherein the second signal field is created from the first signal field if another checksum generated for the first signal field does not match the received checksum.

53. The apparatus of claim 42, wherein the third circuit is also configured to:
disable further processing of the packet by the apparatus, if the generated checksum does not match the received checksum.

54. A method for communications, comprising:
receiving a packet comprising a first signal field with a checksum therein;
defining a second signal field by altering the first signal field, wherein the alteration is based on at least one identifier, and wherein the alteration comprises:
dividing the first signal field into a plurality of sub-fields, and
inserting a bit sequence corresponding to the at least one identifier between the plurality of subfields;
generating a checksum for the second signal field;
comparing the generated checksum with the received checksum; and
determining that the packet is associated with the at least one identifier if the generated checksum matches the received checksum.

55. The method of claim 54, wherein locations of bits of the first signal field modified during the alteration are determined based on the at least one identifier.

56. The method of claim 54, wherein defining the second signal field further comprises:
performing XOR operation between at least one bit of the first signal field and at least one bit of the at least one identifier.

57. The method of claim 54, wherein:
the plurality of sub-fields comprise a first non-altered sub-field and a second non-altered sub-field, and
at least one of a size of the first non-altered sub-field or a size of the second non-altered sub-field is based on the at least one identifier.

58. The method of claim 57, further comprising:
receiving signaling of the at least one of the size of first non-altered sub-field or the size of second non-altered sub-field.

59. The method of claim 54, wherein defining the second signal field further comprises:
scrambling bits of the first signal field based on the at least one identifier.

60. The method of claim 54, further comprising:
receiving signaling information related to the alteration, and
defining the second signal field based on the signaling information.

61. The method of claim 54, wherein the at least one identifier comprises at least one of a source ID or a destination ID.

62. The method of claim 61, further comprising:
receiving an indication about a procedure used for computing the received checksum at an apparatus associated with the source ID.

63. The method of claim 54, wherein the at least one identifier comprises a group ID, and the method further comprising:
receiving an indication about a procedure used for computing the received checksum at an apparatus associated with the group ID.

64. The method of claim 54, wherein the second signal field is created from the first signal field if another checksum generated for the first signal field does not match the received checksum.

65. The method of claim 54, further comprising:
disabling further processing of the packet, if the generated checksum does not match the received checksum.

66. An apparatus for communications, comprising:
means for receiving a packet comprising a first signal field with a checksum therein;
means for defining a second signal field by altering the first signal field based on at least one identifier, wherein the alteration comprises:
dividing the first signal field into a plurality of sub-fields, and
inserting a bit sequence corresponding to the at least one identifier between the plurality of subfields;
means for generating a checksum for the second signal field;
means for comparing the generated checksum with the received checksum; and
means for determining that the packet is associated with the at least one identifier if the generated checksum matches the received checksum.

67. The apparatus of claim 66, wherein locations of bits of the first signal field modified during the alteration are determined based on the at least one identifier.

68. The apparatus of claim 66, further comprising:
means for performing XOR operation between at least one bit of the first signal field and at least one bit of the at least one identifier to define the second signal field.

69. The apparatus of claim 66, wherein:
the plurality of sub-fields comprise a first non-altered sub-field and a second non-altered sub-field, and
at least one of a size of the first non-altered sub-field or a size of the second non-altered sub-field is based on the at least one identifier.

70. The apparatus of claim 69, wherein the means for receiving is further configured to:
receive signaling of the at least one of the size of first non-altered sub-field or the size of second non-altered sub-field.

71. The apparatus of claim 66, further comprising:
means for scrambling bits of the first signal field based on the at least one identifier to define the second signal field.

72. The apparatus of claim 66, wherein:
the means for receiving is further configured to receive signaling information related to the alteration, and the apparatus further comprising
means for defining the second signal field based on the signaling information.

73. The apparatus of claim 66, wherein the at least one identifier comprises at least one of a source ID or a destination ID.

74. The apparatus of claim 73, wherein the means for receiving is further configured to:
receive an indication about a procedure used for computing the received checksum at an apparatus associated with the source ID.

75. The apparatus of claim 66, wherein:
the at least one identifier comprises a group ID, and
the means for receiving is further configured to receive an indication about a procedure used for computing the received checksum at an apparatus associated with the group ID.

76. The apparatus of claim 66, wherein the second signal field is created from the first signal field if another checksum generated for the first signal field does not match the received checksum.

77. The apparatus of claim 66, further comprising:
means for disabling further processing of the packet by the apparatus, if the generated checksum does not match the received checksum.

78. A computer-program product for communications, comprising a non-transitory computer-readable medium encoded with instructions executable to:
receive a packet comprising a first signal field with a checksum therein;
define a second signal field by altering the first signal field, wherein the alteration is based on at least one identifier, and wherein the alteration comprises:
dividing the first signal field into a plurality of sub-fields, and
inserting a bit sequence corresponding to the at least one identifier between the plurality of subfields;
generate a checksum for the second signal field;
compare the generated checksum with the received checksum; and
determine that the packet is associated with the at least one identifier if the generated checksum matches the received checksum.

79. An access terminal, comprising:
at least one antenna;
a receiver configured to receive, via the at least one antenna, a packet comprising a first signal field with a checksum therein;
a first circuit configured to define a second signal field by altering the first signal field, wherein the alteration is based on at least one identifier, and wherein the alteration comprises:
divide the first signal field into a plurality of sub-fields and
insert a bit sequence corresponding to the at least one identifier between the plurality of subfields;
a second circuit configured to generate a checksum for the second signal field; and
a third circuit configured to compare the generated checksum with the received checksum, and to determine that the packet is associated with the at least one identifier if the generated checksum matches the received checksum.

* * * * *